(12) United States Patent
Fan et al.

(10) Patent No.: US 7,399,339 B2
(45) Date of Patent: Jul. 15, 2008

(54) POLYOXOMETALATE MATERIAL FOR GASEOUS STREAM PURIFICATION AT HIGH TEMPERATURE

(75) Inventors: Qinbai Fan, Chicago, IL (US); Michael Onischak, St. Charles, IL (US); William E. Liss, Libertyville, IL (US)

(73) Assignee: Gas Technology Institute, Des Plaines, IL (US)

( * ) Notice: Subject to any disclaimer, the term of this patent is extended or adjusted under 35 U.S.C. 154(b) by 518 days.

(21) Appl. No.: 11/153,844

(22) Filed: Jun. 15, 2005

(65) Prior Publication Data

US 2006/0283323 A1 Dec. 21, 2006

(51) Int. Cl.
*B01D 53/22* (2006.01)
*B01D 71/00* (2006.01)
(52) U.S. Cl. ............... 95/55; 95/45; 96/4; 96/10
(58) Field of Classification Search ............ 95/45, 95/47–54, 55; 96/12–14, 10
See application file for complete search history.

(56) References Cited

U.S. PATENT DOCUMENTS

| | | | | |
|---|---|---|---|---|
| 3,957,559 A * | 5/1976 | Hoffman, Jr. | ............... | 156/254 |
| 4,923,679 A * | 5/1990 | Fukasawa et al. | ............. | 422/48 |
| 4,985,053 A * | 1/1991 | Sugie | ............ | 96/14 |
| 5,037,610 A * | 8/1991 | Fukasawa et al. | ........... | 422/248 |
| 5,147,424 A * | 9/1992 | Tsuchida et al. | .............. | 96/14 |
| 5,183,482 A * | 2/1993 | Najjar et al. | .................. | 95/51 |
| 6,183,717 B1* | 2/2001 | Khan | ...................... | 423/594.1 |
| 6,187,157 B1* | 2/2001 | Chen et al. | .................. | 204/296 |
| 6,592,782 B2* | 7/2003 | MacKay et al. | ............. | 252/500 |
| 6,626,980 B2* | 9/2003 | Hasse et al. | .................... | 95/51 |
| 6,656,252 B2* | 12/2003 | Kita et al. | ........................ | 96/4 |
| 6,713,076 B1* | 3/2004 | Hill et al. | .................... | 424/402 |
| 6,902,676 B2* | 6/2005 | Arcella et al. | ................. | 210/640 |
| 7,258,820 B2* | 8/2007 | Elangovan et al. | ....... | 252/518.1 |
| 7,288,135 B2* | 10/2007 | Julsrud et al. | .................. | 95/55 |
| 2003/0110947 A1* | 6/2003 | Kita et al. | ........................ | 96/4 |
| 2004/0019143 A1* | 1/2004 | Koloski et al. | .............. | 524/434 |
| 2004/0237780 A1* | 12/2004 | Ma et al. | ........................ | 95/55 |
| 2007/0137477 A1* | 6/2007 | Freeman et al. | ................ | 95/45 |
| 2007/0209505 A1* | 9/2007 | Liu et al. | ........................ | 95/45 |
| 2007/0245897 A1* | 10/2007 | Besecker et al. | ............... | 96/11 |

* cited by examiner

*Primary Examiner*—Duane Smith
*Assistant Examiner*—Robert A Clemente
(74) *Attorney, Agent, or Firm*—Mark E. Fejer

(57) ABSTRACT

A method for purification of a gaseous stream having at least one impurity in which a porous material having at least one polyoxometalate-based material is contacted with the gaseous stream and the at least one impurity is passed through the porous material, producing a purified gaseous stream.

21 Claims, 6 Drawing Sheets

POLYOXOMETALATE MATERIAL FOR GASEOUS STREAM PURIFICATION AT HIGH TEMPERATURE

BACKGROUND OF THE INVENTION

1. Field of the Invention

This invention relates to a method and apparatus for removal at high temperatures of undesirable components, or impurities, from a gaseous stream containing said undesirable components. Depending upon the source of the gaseous stream, e.g. fossil fuel combustion or reforming, the undesirable components that may be addressed by various embodiments of the method and apparatus of this invention include, but are not limited to, $NO_x$, $SO_x$, $HgO$, $H_2S$, $CO_2$, $HCl$, and $NH_3$. More particularly, this invention relates to the use of polyoxometalate materials for purification of gaseous streams, such as hydrogen-containing gaseous streams produced by fossil fuel reforming, flue gases produced by fossil fuel combustion, and solid fuel gasification products, and for processing gaseous streams such as natural gas processing, comprising these undesirable components at high temperatures. The polyoxometalate materials selectively remove the undesirable components by absorption and/or diffusion through a layer of the polyoxometalate materials by concentration difference and concentrate them for more effective and efficient removal by currently available technologies.

2. Description of Related Art $H_2S$, $CO_2$, $HCl$, and $NH_3$ are byproducts from natural gas, coal gasification or fossil oil reforming which can produce a hydrogen-rich fuel. Removing these contaminants from the hydrogen-rich fuel supplied to proton exchange membrane fuel cell systems (PEMFC) is necessary as the $H_2S$, $HCl$, and $NH_3$ poison the fuel cell membrane and catalysts. The $CO_2$ and extra water then dilute the fuel and reduce the fuel cell performance. However, these can be removed by other means.

Current techniques for removing these contaminants include low-temperature membrane gas separation to remove $CO_2$ and $NH_3$ at temperatures less than about 120° C., CuO/ZnO catalysts to remove $H_2S$ at moderately high temperatures, and Pd-based membranes for hydrogen separation. However, these techniques generally suffer from various limitations including short lifetimes and non-continuous removal of impurities, and they require substantial efforts for regeneration.

Polyoxometalate-based organic-inorganic hybrid materials, which are well-defined, discrete transition metal oxide clusters with a variety of organic ligands as charge-compensating cations, have been applied in many fields, such as catalysis, medicine, materials, surface chemistry, and photo- and electro-chromism. These unique materials are thermally stable at temperatures greater than 300° C. and capable of reversible sorption of gases and organic vapors ($CO_2$, $CHCl_3$, etc.). In addition, polyoxometalates are based on very low-cost starting materials, thereby providing the potential for very attractive manufacturing costs.

Pressure swing adsorption (PSA) is an adiabatic process for purification of gases in which the impurities in the gases are removed by adsorption through suitable adsorbents in fixed beds contained in pressure vessels under high pressure. Regeneration of the adsorbents is accomplished by counter-current depressurization and by purging at low pressure with previously recovered substantially product-quality gas. To obtain a continuous flow of product, a minimum of two adsorbers is required. In this manner, one adsorber receives feed gas and actually produces a product gas of desired purity while the other adsorber performs the steps of depressurization, purging and repressurization back to the adsorption pressure. After such adsorbent regeneration and repressurization, the functions of the adsorbers are switched. Depending upon the type of impurity to be adsorbed and removed, adsorbents to be used comprise zeolitic molecular sieves, activated carbon, silica gel and activated alumina. Typically, layers of different adsorbent beds are used, thereby dividing the adsorber contents into a number of distinct zones. Monitoring and proper control of process parameters ensures a stable operation. Stable operation means a pendulating swing in each particular location, in adsorber bed or piping, of values for all parameters, i.e. pressure, temperature, flow and composition of gaseous and adsorbed phase.

SUMMARY OF THE INVENTION

The invention claimed herein is a method for selectively separating impurities in a gaseous stream from the gaseous stream employing a material specifically tailored for the separation, producing a significantly purified gaseous stream. In accordance with one embodiment of this invention, hydrogen in a hydrogen-rich fuel stream, such as is obtained, for example, from fuel reforming processes is purified employing a material specifically tailored for and embedded in a purification device for the separation and purification of hydrogen.

The material employed in the method of this invention comprises at least one polyoxometalate (POM), a combination of a polymer, metal oxide and ligand, which is capable of selectively removing the impurities of interest. For purification of hydrogen from a hydrogen-rich stream, the impurities typically include $HCl$, $CO_2$, $H_2S$ and/or $NH_3$. In accordance with one preferred embodiment of this invention, the POM is disposed within a porous material. This material can remove polar molecules, such as $H_2S$, $HCl$, $NH_3$ and water as well as other impurities, such as $CO$ and $CO_2$. This material and the method of its use, in addition to removing impurities from the hydrogen gas streams which are generated from natural gas reformers or coal gasification hydrogen generators and removing impurities during gaseous stream processing, such as natural gas processing, also reduce the size of the equipment used for pressure swing absorption (PSA). When used, for example, in connection with hydrogen gas streams, with smaller PSA equipment, the loss of hydrogen between adsorption and regeneration swings also becomes much smaller. Thus, overall efficiency is increased and the PSA equipment size, cost and operating costs are reduced with effective impurity removal.

Selective separation of impurities from a gaseous stream comprising the impurities to produce a cleaner gaseous stream is accomplished in accordance with one embodiment of this invention by contacting a porous material comprising at least one polyoxometalate material with the gaseous stream and passing at least a portion of one of the impurities in the gaseous stream through the porous material, producing at least a partially purified gaseous stream.

In accordance with one embodiment of this invention, the gaseous stream is a hydrogen-rich stream comprising $H_2S$, $HCl$, and $NH_3$ and selective removal of these impurities therein produces substantially purified hydrogen. Exemplary of a POM-based material suitable for use in this embodiment of the method of this invention is $[Cu_2(4,4'\text{-bpy})_2\{Mo_2O_7\}]_n$, (where bpy is bipyridine), which is a polymer having CuO functions for the adsorption of $H_2S$, a pyridine ring to adsorb HCl, and Cu or Mo to adsorb $NH_3$. These adsorptions have weak adsorption forces between the gases and the adsorption sites due to the ligand effect and site resistance. Therefore, these reversible adsorption materials adsorb impurities on one side and desorb the impurities on the other side of a separation wall comprising the POM-based material.

The entire method of this invention may be continuous. The purity of the final gas depends upon the length of the gas travel path, that is, the gas retention time in the device. The POM-based material may be embedded in a porous ceramic material and in accordance with one preferred embodiment of this invention is embedded in an $Al_xO_3$-based ceramic tube. The ceramic tube removes water and the POM-based material disposed in the ceramic tube prevents hydrogen permeate and removes impurities.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

This invention involves the use of polyoxometalates for separation of contaminants or impurities from, and purification of, gaseous streams comprising one or more such contaminants or impurities. The invention is suitable for use on gaseous streams at high temperatures, i.e. in the range of about 200° C. to about 400° C., as well as at lower temperatures. Although suitable for separation of contaminants or impurities from a variety of gaseous streams including flue gases and reformates, the method of this invention is particularly attractive for purification of hydrogen in by-product streams from natural gas, coal gasification and/or fossil fuel reforming processes. In addition to hydrogen, these by-product streams typically comprise $H_2S$, $CO_2$, CO, HCl, $NH_3$ and water, one or more of which can be detrimental to the successful operation of hydrogen-based applications, such as distributed polymer electrolyte membrane fuel cell power systems and hydrogen vehicle refueling stations.

The polyoxometalate-based organic-inorganic hybrid materials employed in the method of this invention have the attributes of the conventional low temperature membrane separation and high temperature CuO/ZnO catalyst adsorbent for gas purification. The polyoxometalate-based materials employable in accordance with one embodiment of the method of this invention comprise nitrogen-containing ligands. In accordance with preferred embodiments of this invention, the nitrogen-containing ligand is selected from the group consisting of amines, pyrroles, pyridines, imidazoles, and combinations thereof. In addition, the polyoxometalate-based materials in accordance with one embodiment of this invention comprise a metal selected from the group consisting of Cu, Zn, Mo, Mn, W, and combinations and alloys thereof. Exemplary of a POM-based material suitable for use in the method of this invention is $[Cu_2(4,4'-bpy)_2\{Mo_2O_7\}]_n$, the structure of which is

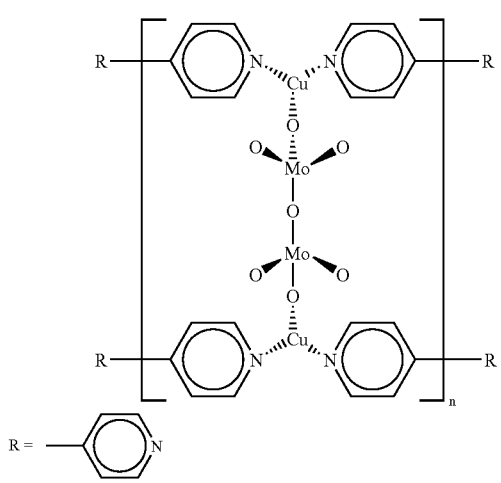

As previously indicated, the CuO functions to adsorb $H_2S$, the pyridine ring functions to adsorb HCl, and the Cu or Mo function to adsorb $NH_3$.

Another POM-based material suitable for use in the method of this invention is similar to the above polymer, but with poly(4-vinylpyridine) and has the following structure:

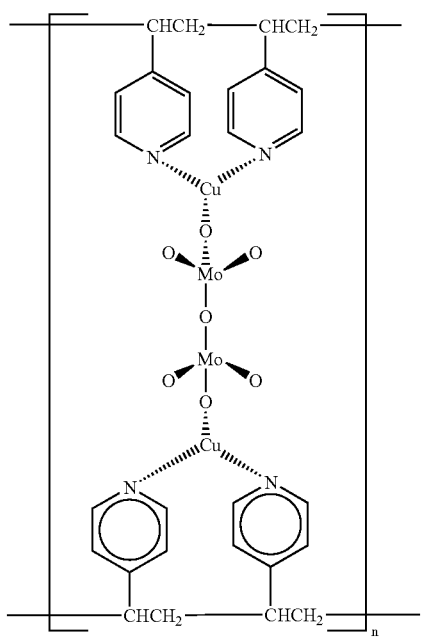

Yet another POM-based material suitable for use in accordance with one embodiment of this invention is poly(2,5-benzimidazole) (ABPBI), which has the following structure:

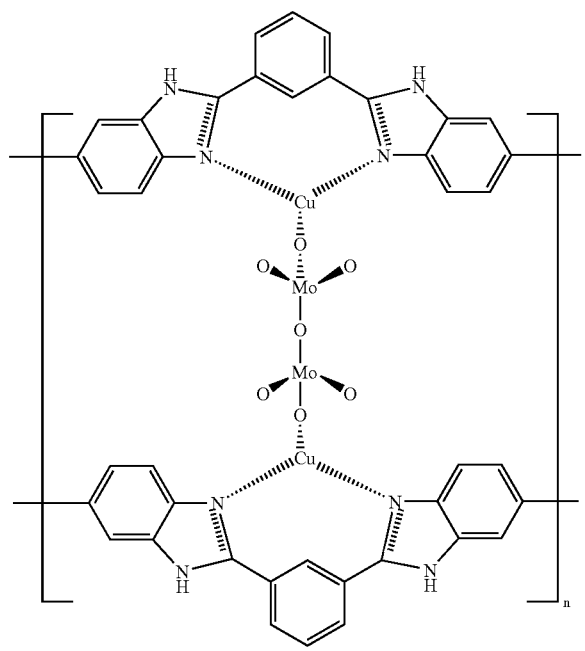

Figure 1:
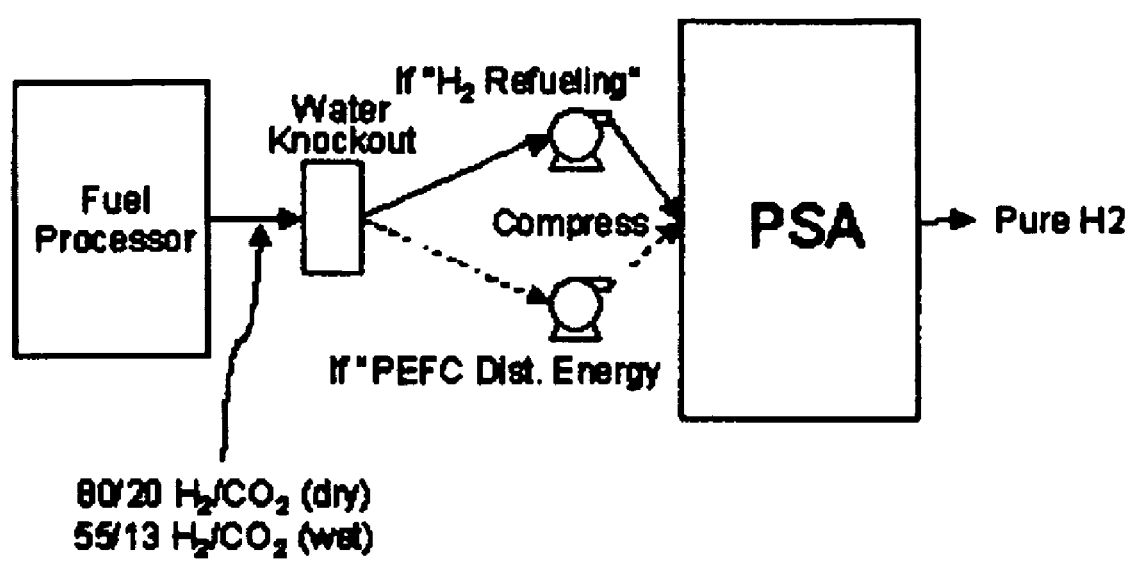
FIG. 1 is a diagram showing a conventional PSA reformate hydrogen purification process.
Figure 2:
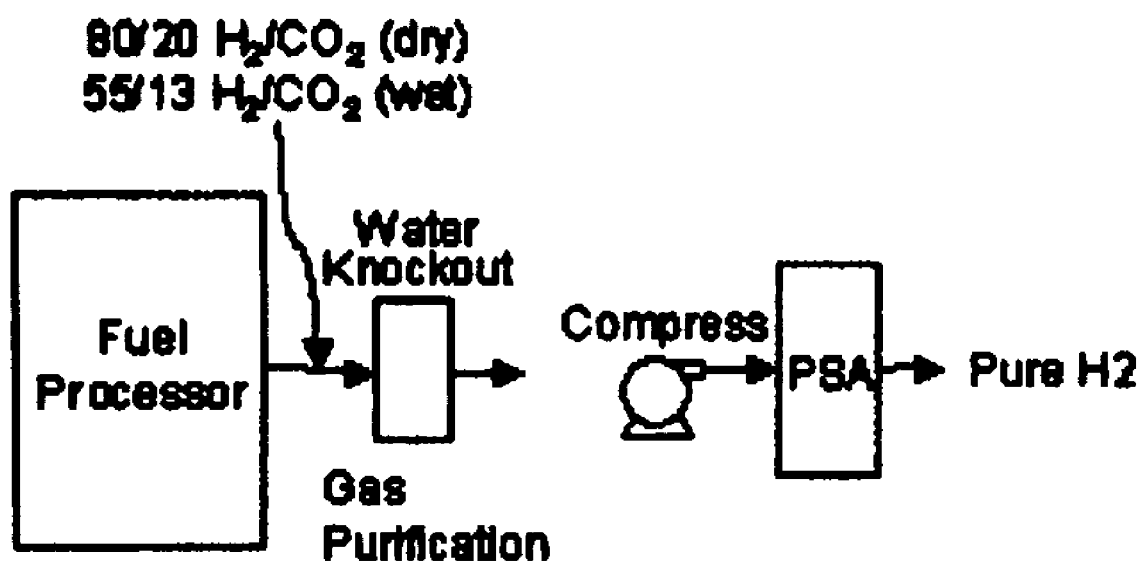
FIG. 2 is a diagram showing a PSA reformate hydrogen purification process with a POM-based purifier in accordance with one embodiment of this invention.

FIGS. 1 and 2 show complete fuel processing-purification systems to produce hydrogen from reformate fuel produced by steam-methane reforming. In the conventional system shown in FIG. 1, purified hydrogen for either a refueling station or for distributed generation polymer electrolyte membrane fuel cells is produced. As shown, the reformate gases from the fuel processor are dried to remove excess water prior to compression to about 4 to 6 atmospheres pressure for the PSA operation. In this case, the PSA equipment size is quite large because its design is dominated by the high concentration of $CO_2$, trace $H_2S$, HCl, and $NH_3$ in the gases going through compression and into the PSA process. In contrast thereto, in the system of FIG. 2 employing the POM-based materials in accordance with the method of this invention, the PSA equipment size is substantially smaller, with less hydrogen losses, lower equipment costs and reduced horsepower requirements due to the knock-out of water and removal of impurities prior to compression of the gases entering the PSA process. In this case, both the impurities and the PSA sweep gas are directed back to the fuel processor burner zone for environmental control.

The application of the POM-based material to remove $H_2S$ from $H_2S$-containing gaseous streams in accordance with one embodiment of this invention eliminates the conventionally employed zinc oxide desulfurizer system. Other suitable applications for POM-based materials in accordance with this invention include acid gas removal from subquality natural gas and treatment of biomass-related gases. Successful implementation of this low-cost POM-based material for separation of $CO_2$ from $H_2$ in reformate streams produced from natural gas steam reforming reduces the cost and complexity of present gas cleanup technology. Yet another suitable application of the POM-based material is in connection with sensors for detecting the presence and/or concentration of contaminants in a gaseous stream, as well as enhancing the sensitivity of gas sensors by removing components of a gaseous stream which may interfere with the detection capabilities of the sensor.

Figure 3:
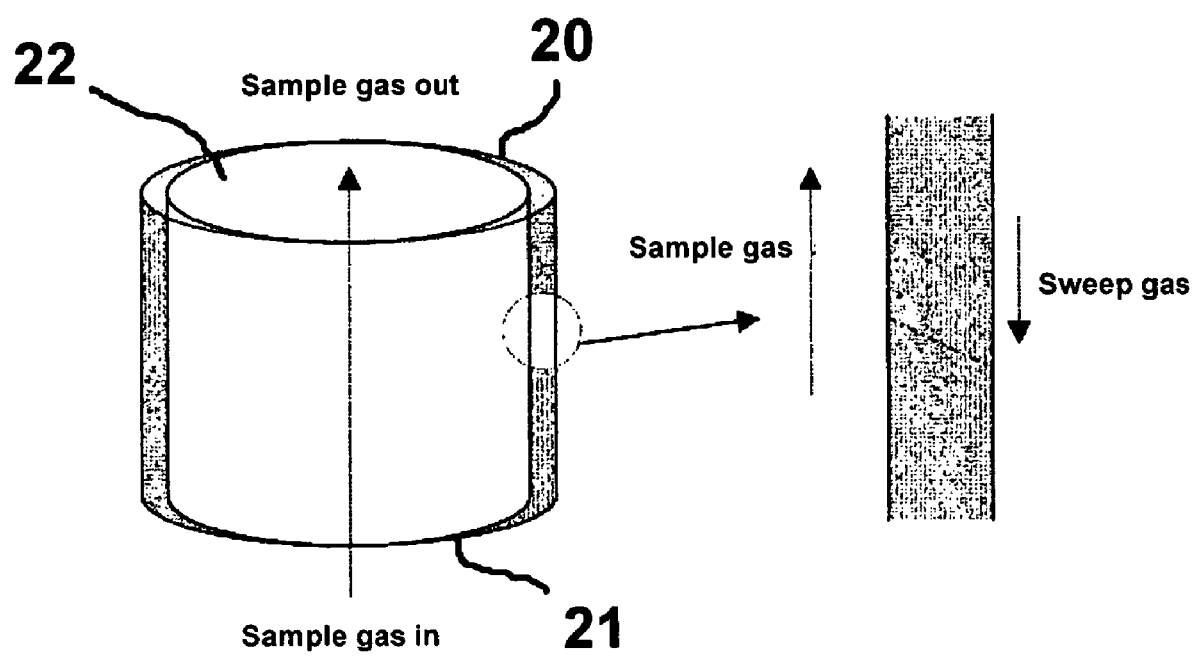
FIG. 3 is a schematic diagram of a hydrogen purification device in accordance with one embodiment of this invention.

FIG. 3 shows an apparatus for carrying out the method of this invention comprising a porous ceramic tube 20 having a gas inlet end 21 and a gas outlet end 22. A POM-based material is embedded within the porous wall of the porous ceramic tube. Embedding of the POM-based material may be achieved dip-coating and/or penetration into the pores of the ceramic tube. In operation, the hydrogen-rich gas is passed through the gas inlet end 21 and the interior of the ceramic tube, water and impurities in the hydrogen-rich gas are removed through the porous tube walls by means of vacuum extraction or sweep gas purge, and clean hydrogen gas with a reduced amount of water is removed from the gas outlet end 22 of the tube.

EXAMPLE 1

In this example, the synthesis of a POM-based material suitable for use in accordance with one embodiment of the method of this invention was carried out by the hydrothermal reaction of the following ingredients in the molar ratio of 1:1:1:0.5:500:

Sodium molybdate dihydride: 2.42 g (Aldrich Chemicals)
Copper (II) sulfate penta hydrite: 2.50 g (Aldrich Chemicals)
4,4'-Bipyridyl: 1.56 g (Aldrich Chemicals)
Arsenic (III) Oxide: 0.98 g Aldrich Chemicals)
Deionized water: 90.0 g The above materials were charged into a TEFLON® beaker and then put into a stainless steel bomb fitted with a stirrer. The stainless steel bomb was wrapped with heating tape and heated to about 170° C. The reaction was carried out for 5 days with slow stirring. The bomb pressure during the reaction time rose to 100-150 psi. After 5 days of reaction time, the stainless steel bomb was cooled down, depressurized and opened. Greenish powder settled down at the bottom was filtered and washed four times with deionized water and then dried in oven at 100° C.

EXAMPLE 2

In this example, the synthesis of a POM-based material suitable for use in accordance with one embodiment of the method of this invention was carried out as in Example 1 with the exception that 4,4'-bipyridyl was replaced with poly(4-vinylpyridine).

EXAMPLE 3

In this example, the POM-based material was formed into membranes by compression molding at 500° F. and 34,000 psi of the powder produced in Examples 1 and 2 into circular disk of 1.25" and about 3.5-mil thickness. The molded disk resulting from the compression of the powder of Example 2 is relatively stronger than the molded disk produced from the compression of the powder of Example 1 and, thus, is preferred.

EXAMPLE 4

In this example, a binder material, poly(oxy-1,4-phenylene-oxy-1,4-phenylene-carbonyl-1,4-phenylene) (PEEK, Victrex USA Inc), was added to the POM-based powder to improve the strength of the membrane. PEEK is a high temperature plastic requiring temperatures of about 400° C. to melt.

EXAMPLE 5

In this example, polysulfone (Udel, Solvay Advanced Polymer) was added as a binder to the POM-based powder to improve the strength of the membrane. The resulting membrane was both strong and tough.

EXAMPLE 6

In this example, a POM-based membrane was produced by dispersing a very fine POM-based powder in a solution comprising polyethylenamine (PEI), PEVOH, a copolymer of ethylene and vinyl alcohol, and dimethyl sulfoxide (DMS) in the following proportions:

| | |
|---|---|
| PEVOH (10% solution in DMS) | 40.0 g (Aldrich Chemicals) |
| PEI (10% solution in DMS) | 10.0 g (Aldrich Chemicals) |
| POM-based powder | 2.0 g (Lab synthesized) |
| Formaldehyde (38% solution) | 1.0 g (Aldrich Chemicals) |

After thorough mixing of all of these ingredients, the membrane was cast on a polytetrafluoroethylene (PTFE) substrate using glass rod and dried over night. The dry membrane was then immersed in deionized water for half hour to leach out the remaining solvent. The wet membrane was wiped with tissue and then heated in an oven at 100° C. for about one (1) hour.

EXAMPLE 7

In this example, to increase the elevated temperature stability of the POM-based membrane, the POM-based material was dispersed in a high temperature poly(2,5-Benzimidazole), ABPBI polymer solution in the following proportions and then cast to form the membrane.

| | |
|---|---|
| Poly (2,5-Benzimidazole) ABPBI (2% solution in trifluoroacetic acid and phosphoric acid, Acros Chemicals) | 25.0 g |
| PEVOH (10% solution in formic acid, Acros chemical) | 2.5 g |
| POM-based (Lab synthesized, 20% on polymer) very fine powder. | 0.1 g |

The above ingredients were mixed thoroughly to make a casting dope. The casting dope was cast onto a PTFE substrate and dried over night, producing the membrane.

EXAMPLE 8

In this example, a ceramic tube comprising a POM-based material is prepared by combining $Na_2MoO_4.2H_2O$, $CuSO_4.5H_2O$, poly(4-vinylpyridine) at a molar ratio of about 1:1:2 (pyridine) and water in a round bottom flask and heating the mixture to a temperature of about 180° C. for about two (2) hours. The heated mixture is cooled down after which it is applied to the porous ceramic tube by a coating technique, such as dip-coating, known to those skilled in the art. The coated tube is then heated at about 200° C. for curing.

EXAMPLE 9

In this example, $Na_2MoO_4.2H_2O$ and $CuSO_4.5H_2O$ at a molar ratio of 1:1 are dissolved in water. The porous ceramic tube is immersed in the resulting solution, resulting in satu-

EXAMPLE 10

In this example, $Na_2MoO_4.2H_2O$, $CuSO_4.5H_2O$, (4,4'-bipyridine), and $As_2O_3$, at a molar ratio of about 1:1:1:0.5, are dissolved in water. The $Cu^{2+}$ and $MoO_4^{2-}$ concentration are about 2 M. The porous ceramic tube is saturated with the resulting solution after which the saturated tube is cured at about 180° C. for about 2 hours.

Figure 4:
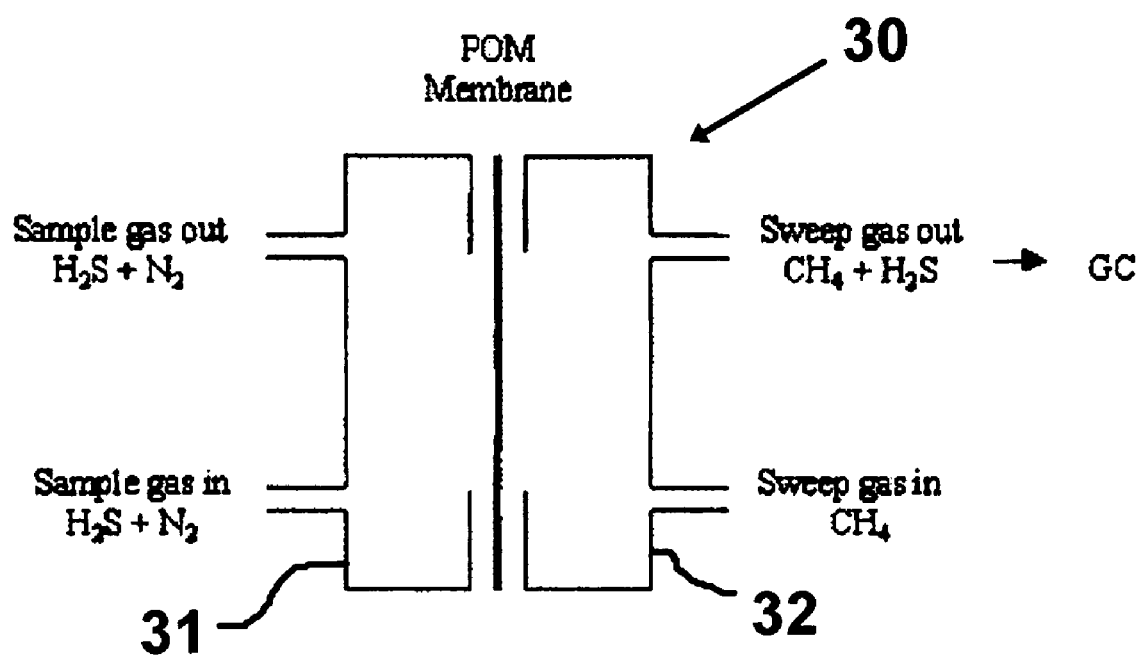
FIG. 4 is a schematic diagram of an experimental set-up employed for the purpose of determining the $H_2S$ removal capabilities of a POM-based material in accordance with one embodiment of this invention.

Using the experimental setup shown in FIG. 4, a sample gas comprising 99% by volume nitrogen and 1% by volume hydrogen sulfide was introduced at a sample gas flow rate of about 48.3 l/min into the sample gas side 31 of a cell 30 having a sample gas side and a sweep gas side 32 and a sweep gas comprising 100% methane was introduced at a sweep gas flow rate of about 5.5 l/min into the sweep gas side of the cell, which sweep gas side was separated from the sample gas side by a POM-based membrane having a thickness of about 2 mils. The sweep gas was used to carry hydrogen sulfide diffusing through the POM-based membrane away from the cell.

Figure 5:
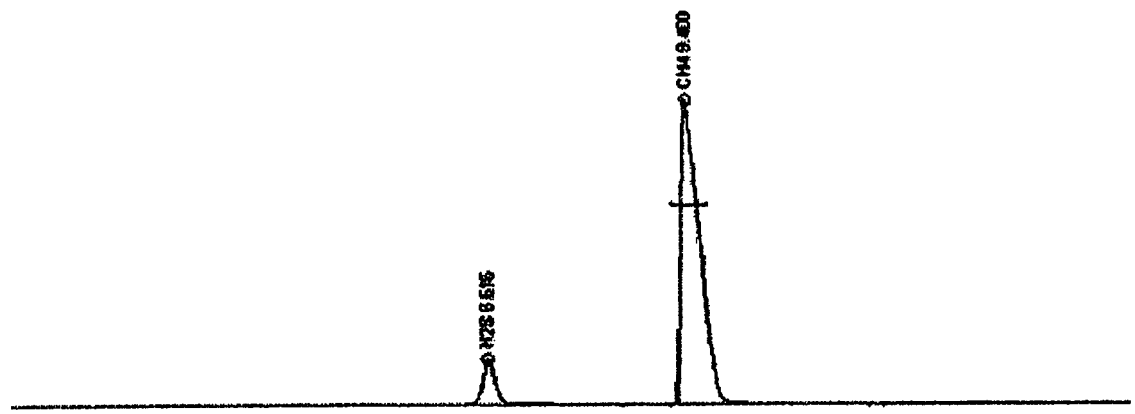
FIG. 5 is a diagram showing typical gas chromatographic signals from the sweep gas employed in accordance with one embodiment of the method of this invention.

Gas chromatographic analysis of the $H_2S$-laden methane sweep gas produced the GC signals shown in FIG. 5. As shown, although the hydrogen sulfide content of the sample gas flowing through the sample gas side of the cell was only about 1%, the hydrogen sulfide concentration in the sweep gas was about 22% by volume. Although not intending to be bound by any single explanation for this surprising result, in spite of the relatively low sweep gas flow rate, it is believed that the amount of hydrogen sulfide in the sweep gas is a function of the velocity of the sweep gas at the surface of the POM-based membrane.

Figure 6:
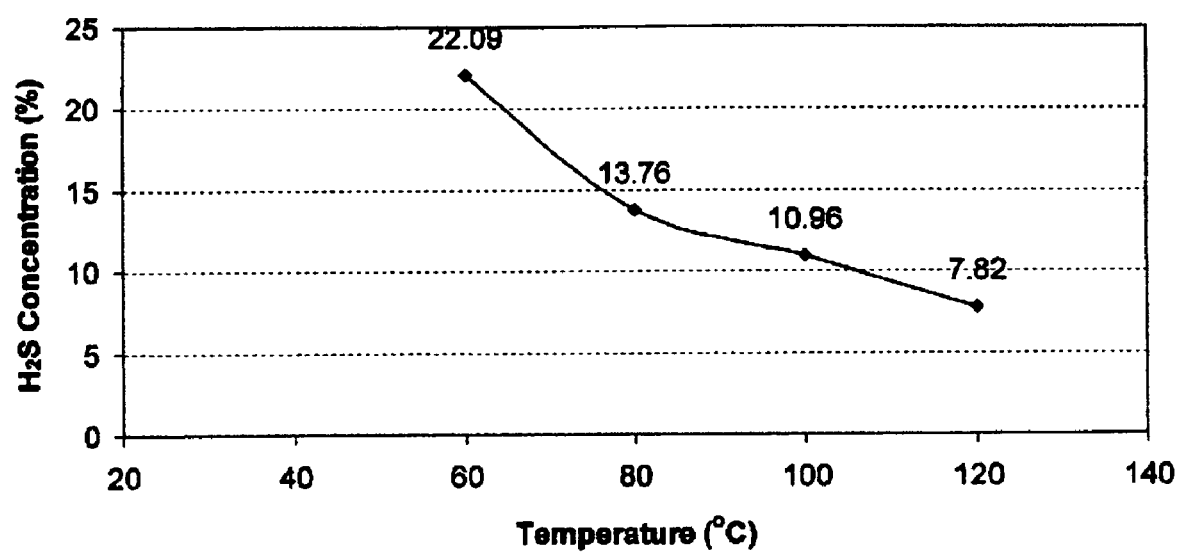
FIG. 6 is a diagram showing $H_2S$ concentration in the sweep gas as a function of temperature.

FIG. 6 shows the effect of temperature on the concentration of hydrogen sulfide in the sweep gas. As shown therein, as the temperature of the POM-based membrane increases, the diffusivity of the hydrogen sulfide in the sample gas decreases.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. A method for hydrogen purification comprising the steps of:
   contacting a porous material comprising at least one polyoxometalate with a fluid stream comprising hydrogen gas and at least one impurity; and
   passing said at least one impurity through said porous material, producing purified hydrogen.

2. A method in accordance with claim 1, wherein said porous material is a ceramic.

3. A method in accordance with claim 2, wherein said polyoxometalate is dispersed throughout said ceramic.

4. A method in accordance with claim 2, wherein said polyoxometalate is disposed on a surface of said ceramic.

5. A method in accordance with claim 1, wherein said porous material is in a form of a ceramic tube and said fluid stream is passed through said ceramic tube.

6. A method in accordance with claim 1, wherein said fluid stream is a hydrogen-containing reformate fuel.

7. A method in accordance with claim 1, wherein said at least one impurity is a polar molecule.

8. A method in accordance with claim 1, wherein said at least one impurity is selected from the group consisting of $H_2S$, HCl, $NH_3$, $CO_2$, water and mixtures thereof.

9. A method in accordance with claim 1, wherein Said polyoxometalate is a polymer having the structure

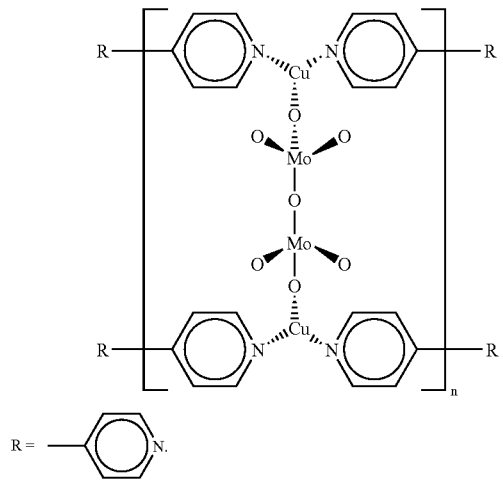

10. A method in accordance with claim 1, wherein said polyoxometalate is a polymer having the structure

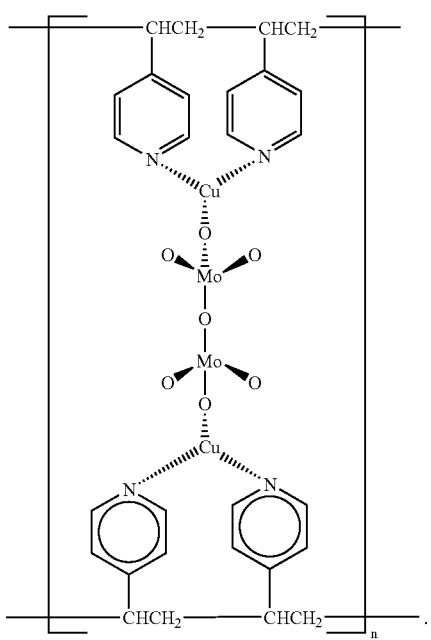

11. A method in accordance with claim 1, wherein said polyoxometalate is a polymer having the structure

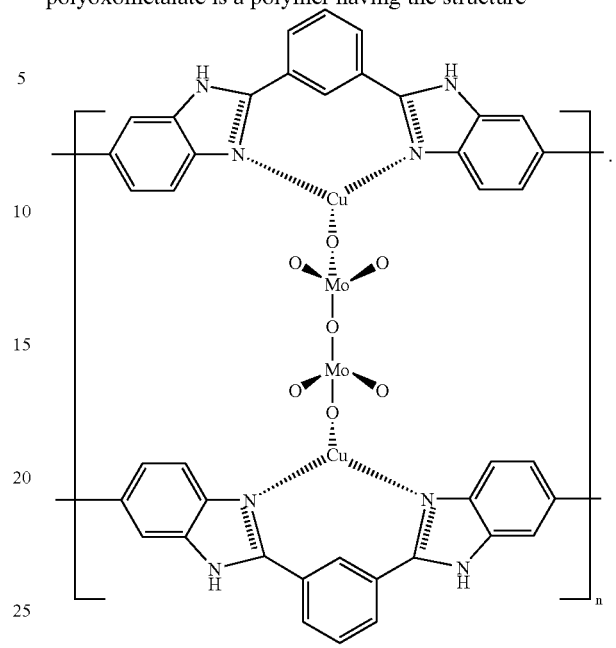

12. A method for removal of at least one impurity from a gaseous stream comprising said at least one impurity, the method comprising the steps of:
contacting a porous ceramic material comprising at least one polyoxometalate with the gaseous stream; and
passing said at least one impurity through said porous material, producing at least a partially purified gaseous stream.

13. A method in accordance with claim 12, wherein said polyoxometalate is dispersed throughout said ceramic.

14. A method in accordance with claim 12, wherein said polyoxometalate is disposed on an outer surface of said ceramic.

15. A method in accordance with claim 12, wherein said porous material is in a form of a ceramic tube and said gaseous stream is passed through said ceramic tube.

16. A method in accordance with claim 12, wherein said gaseous stream comprises a hydrogen-containing reformate fuel.

17. A method in accordance with claim 12, wherein said at least one impurity is a polar molecule.

18. A method in accordance with claim 12, wherein said gaseous stream comprises flue gases.

19. A method in accordance with claim 12, wherein said polyoxometalate is a polymer having the structure

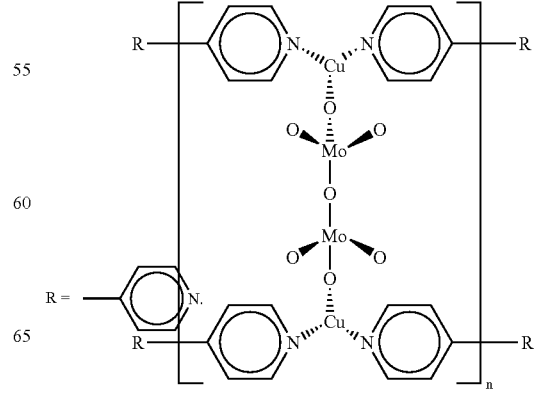

20. A method in accordance with claim 12, wherein said polyoxometalate is a polymer having the structure
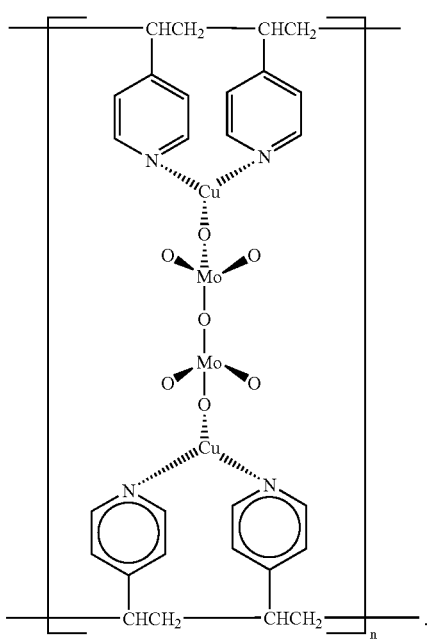
21. A method in accordance with claim 12, wherein said polyoxometalate is a polymer having the structure
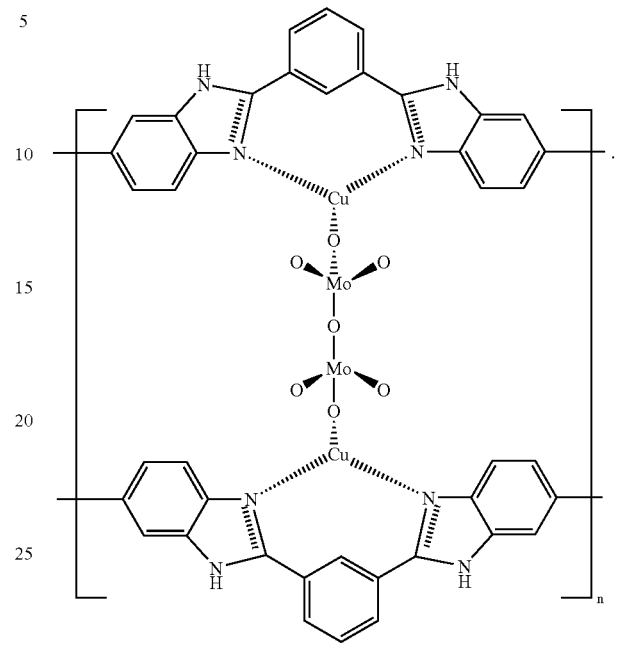
* * * * *